United States Patent
Chao et al.

(10) Patent No.: US 12,033,089 B2
(45) Date of Patent: Jul. 9, 2024

(54) DEEP CONVOLUTIONAL FACTOR ANALYZER

(71) Applicant: Siemens Aktiengesellschaft, Munich (DE)

(72) Inventors: Yuan Chao, Plainsboro, NJ (US); Amit Chakraborty, East Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 1114 days.

(21) Appl. No.: 16/324,663

(22) PCT Filed: Sep. 14, 2017

(86) PCT No.: PCT/US2017/051477
§ 371 (c)(1),
(2) Date: Feb. 11, 2019

(87) PCT Pub. No.: WO2018/053076
PCT Pub. Date: Mar. 22, 2018

(65) Prior Publication Data
US 2019/0197425 A1   Jun. 27, 2019

Related U.S. Application Data

(60) Provisional application No. 62/395,526, filed on Sep. 16, 2016.

(51) Int. Cl.
*G06N 7/01* (2023.01)
*G06F 17/15* (2006.01)
*G06N 20/00* (2019.01)

(52) U.S. Cl.
CPC ............ *G06N 7/01* (2023.01); *G06F 17/15* (2013.01); *G06N 20/00* (2019.01)

(58) Field of Classification Search
CPC .............................. G06N 5/007; G06N 20/00
See application file for complete search history.

(56) References Cited

U.S. PATENT DOCUMENTS

| | | | |
|---|---|---|---|
| 2011/0225108 A1* | 9/2011 | Hawkins | G06N 3/08 706/12 |
| 2013/0054496 A1* | 2/2013 | Marianetti, II | G06N 5/047 706/12 |
| 2015/0127595 A1* | 5/2015 | Hawkins, II | G06N 7/01 706/46 |
| 2016/0163035 A1* | 6/2016 | Chang | G06N 3/045 382/149 |

OTHER PUBLICATIONS

Lan et al, "Toward Automated Anomaly Identification in Large-Scale Systems", IEEE Transactions on Parallel and Distributed Systems 21(2):174-187, DOI:10.1109/TPDS.2009.52 (Year: 2010).*

(Continued)

*Primary Examiner* — Li B. Zhen
*Assistant Examiner* — Leah M Feitl

(57) ABSTRACT

Systems, methods, and computer-readable media are disclosed for generating and training a deep convolutional generative model for multivariate time series modeling and utilizing the model to assess time series data indicative of a machine or machine component's operational state over a period of time to detect and localize potential operational anomalies.

12 Claims, 6 Drawing Sheets

(56) References Cited

OTHER PUBLICATIONS

Laptev et al., "Generic and Scalable Framework for Automated Time-series Anomaly Detection", KDD '15: Proceedings of the 21th ACM SIGKDD International Conference on Knowledge Discovery and Data Mining, Aug. 2015 pp. 1939-1947, https://doi.org/10.1145/2783258.2788611 (Year: 2015).*
Lee et al, "Convolutional deep belief networks for scalable unsupervised learning of hierarchical representations". In Proceedings of the 26th Annual International Conference on Machine Learning (ICML '09). Association for Computing Machinery, https://doi.org/10.1145/1553374.1553453 (Year: 2009).*
Yuan, "Multi-task Learning for Bayesian Matrix Factorization," 2011 IEEE 11th International Conference on Data Mining, 2011, pp. 924-931, doi: 10.1109/ICDM.2011.107. (Year: 2011).*
Tang et al. "Deep mixtures of factor analysers." Appearing in Proceedings of the 29th International Conference on Machine Learning, Edinburgh, Scotland, UK, 2012. arXiv preprint arXiv:1206.4635 (2012). (Year: 2012).*
Ghahramani et al, "The EM Algorithm for Mixtures of Factor Analyzers", Technical Report CRG-TR-96-1, May 21, 1996 (Year: 1996).*
Paisley et al, "Nonparametric factor analysis with beta process priors", ICML '09: Proceedings of the 26th Annual International Conference on Machine Learning, Jun. 2009, pp. 777-784, https://doi.org/10.1145/1553374.1553474 (Year: 2009).*
Chen et al, "The Hierarchical Beta Process for Convolutional Factor Analysis and Deep Learning", Proceedings of the 28th International Conference on Machine Learning, Bellevue, WA, USA, 2011 (Year: 2011).*
Jolliffe et al, "Principal component analysis: a review and recent developments", Phil. Trans. R. Soc. A.374: 20150202; Published: Apr. 13, 2016 http://doi.org/10.1098/rsta.2015.0202 (Year: 2016).*
M. Hasan et al: "Learning temporal regularity in video sequences" Proceedings of the 2016 IEEE Conference on Computer Vision and Pattern Recognition (CVPR '16), Jun. 27, 2016 (Jun. 27, 2016), pp. 733-742, XP033021250 / 27.06.2016.
S. Ahmad, s. Purdy: "Real-time anomaly detection for streaming analytics", arXiv:1607.02480vl, Jul. 8, 2016 (Jul. 8, 2016), XP080713012 / 08.07.2016.
M. Momtazpour et al: "Analyzing invariants in cyber-physical systems using latent factor regression", Proceedings of the 21st ACM SIGKDD Conference on Knowledge Discovery and Data Mining (KDD '15), Aug. 11, 2015 (Aug. 11, 2015), pp. 2009-2018, XP058071258 / 11.08.2015.
S. Xu et al: "Bayesian wavelet PCA methodology for turbomachinery damage diagnosis under uncertainty", Mechanical Systems and Signal Processing, vol. 80, May 4, 2016 (May 4, 2016), pp. 1-18, XP029593717 / 04.05.2016.
Y. S. Chong, Y. H. Tay: "Modeling representation of videos for anomaly detection using deep learning: a review", arXiv: 1505.00523vl, May 4, 2015 (May 4, 2015), XP055434499 / 04.05.2015.
B. Chen et al: "Deep learning with hierarchical convolutional factor analysis", IEEE Transactions on Pattern Analysis and Machine Intelligence, vol. 35, No. 8, Jan. 9, 2013 (Jan. 9, 2013), pp. 1887-1901, XP011515335 / 09.01.2013.
International Search Report dated Dec. 12, 2017; PCT/US2017/051477; International Filing Date: Sep. 14, 2017; 11 pages.

* cited by examiner

DEEP CONVOLUTIONAL FACTOR ANALYZER

This application is a national phase filing under 35 U.S.C. § 371 of International Patent Application No. PCT/US2017/051477, filed Sep. 14, 2017, which claims the benefit of priority to U.S. Provisional Patent Application Ser. No. 62/395,526, filed Sep. 16, 2016, which are incorporated herein by reference in their entirety.

BACKGROUND

A variety of sensors may be used to monitor various operational parameters of a machine or process. Such sensors may generate a multivariate time series of data by performing sampling at prescribed time intervals. Various models may be used to evaluate the multivariate time series data such as, for example, generative graphical models. However, such models suffer from a number of drawbacks, technical solutions to which are discussed herein.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
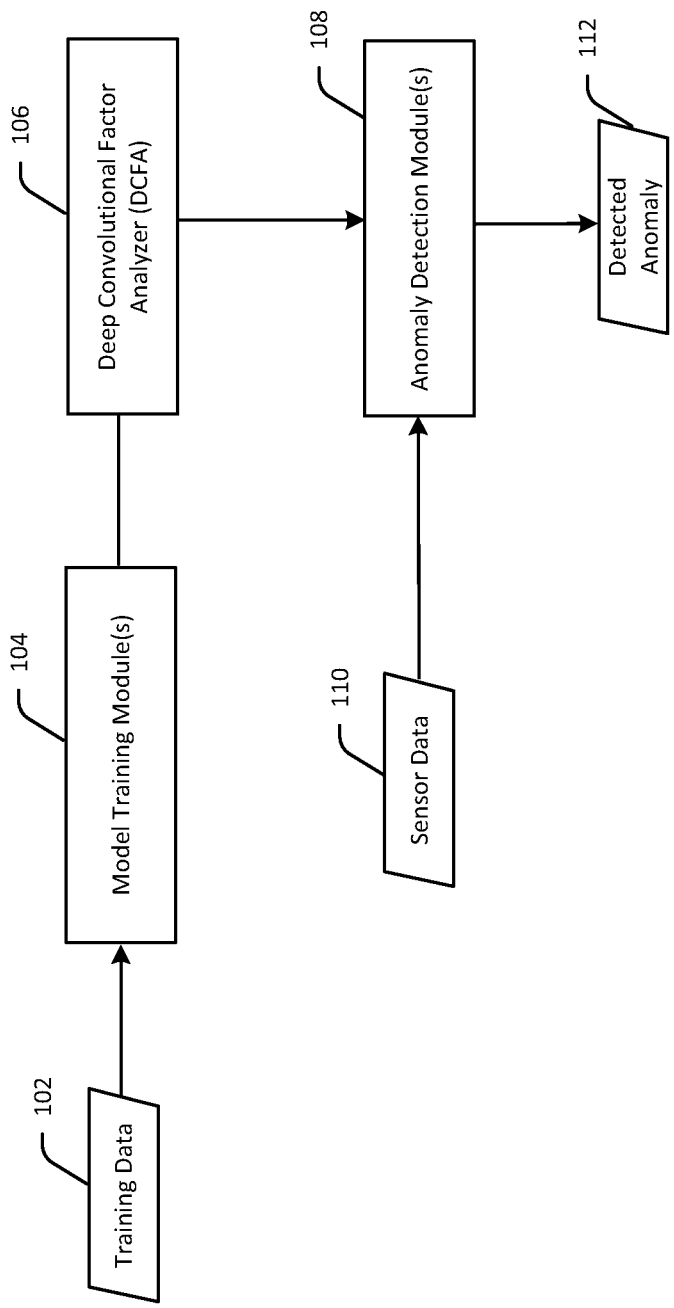
FIG. 1 is a hybrid system component/data flow diagram illustrating the training of a deep convolutional factor analyzer (DCFA) and the application of the trained DCFA to sensor data for anomaly detection in accordance with one or more example embodiments of the disclosure.

This disclosure relates to, among other things, devices, servers, systems, methods, computer-readable media, techniques, and methodologies for generating and training a deep convolutional factor analyzer (DCFA) for multivariate time series modeling and utilizing the DFCA to assess time series data indicative of a machine or machine component's operational state over a period of time to detect and localize potential operational anomalies. It should be appreciated that while example embodiments of the disclosure may be described herein in relation to a DFCA, other deep generative models capable of modeling temporal and spatial dependencies that can be trained using a training algorithm disclosed herein are also within the scope of this disclosure.

Deep generative models perform significantly better than graphical models for a number of machine learning tasks. However, such models are difficult to train because their latent variables typically do not have an analytical posterior distribution, largely due to nonlinear activation units such as sigmoid functions. While methods exist to approximate posterior distributions in such cases, such methods can be impracticably slow when applied to deep models. Disclosed herein is a deep convolutional generative model that offers a technical solution to the aforementioned drawbacks of existing deep generative models. A deep convolutional generative model in accordance with example embodiments of the disclosure can be trained more quickly than conventional models using a training algorithm disclosed herein that is less complex than existing training methods, while also providing high performance in connection with anomaly detection, classification, and clustering, for example. These technical effects represent a technical solution over existing deep generative models.

A deep convolutional generative model in accordance with example embodiments of the disclosure may be a DCFA that is obtained, at least in part, by extending a factor analyzer to model temporal dependencies in addition to spatial dependencies. In certain example embodiments, this may be achieved may replacing a factory analyzer's vector inner product with convolution. A DCFA in accordance with example embodiments of the disclosure has a deep structure containing multiple model layers. In a bottom layer, variables may be assumed to be independent. These bottom layer variables may be up-sampled and convoluted with a next layer filter to form variables of the next layer. This bottom-up process may continue layer by layer until the original time series at a top layer is generated. Adjacent layers of the DCFA may be viewed as a bipartite graph that, while not fully connected, is locally connected with the extent of connectivity depending on the filter length. This configuration enables a sufficient but not extensive amount of temporal dependency while reducing complexity of the model. A DCFA in accordance with example embodiments of the disclosure may only contain linear Gaussian nodes such that all dependency in the model is Gaussian. As a result, the posterior distributions of latent variables are also Gaussian and can be easily estimated using techniques such as a variational Bayes algorithm. In addition, a DCFA in accordance with example embodiments is a probabilistic model that is capable of determining the probability of observing time series data, and thus, can be used to identify the spatial and temporal location of anomalous data.

Generation of a DCFA in accordance with example embodiments of the disclosure will be described in greater detail hereinafter. A multivariate time series x may be defined as $x=\{x(1), x(2), \ldots, x(T)\}$, where $x(t) \in \mathbb{R}^d$ indicates the time series at a particular time t, and where d and T are the spatial dimension and length of the time series, respectively. A subscript may be used herein to denote the index of multiple time series and a superscript may be used to indicate the layer index for a deep network. For example, $m_k^{(l)}(t)$ indicates a variable at time t in the l-th layer of the deep network for the k-th time series. In addition, the abbreviation a:b may be used herein to denote the set of indices from a to b. For example, 1:L may denote the set of indices $\{1, 2, \ldots, L\}$.

A factor analyzer is a type of generative model that represents a D-dimensional random vector $y \in \mathbb{R}^D$ via a d-dimensional latent random vector $x \in \mathbb{R}^D$. More specifically, a factor analyzer may be given by the following equation: $y=Ax+b+\epsilon$ (Equation (1)). In Equation (1), $A \in \mathbb{R}^{D \times d}$ is a factor loading matrix and $b \in \mathbb{R}^D$ is a mean vector. D is typically larger than d. Further, x is assumed to have a Gaussian distribution $P(x)=N(x|0, I_d)$, where $I_d \in \mathbb{R}^{D \times d}$ is an identity matrix. In addition, $\epsilon \in \mathbb{R}^D$ is an error vector having a Gaussian distribution $P(\epsilon)=N(\epsilon|0, \psi)$. The covariance $\psi \in \mathbb{R}^{D \times d}$ is a diagonal matrix with independent noise variances for each dimension. When all these noise variances are equal, a factor analyzer degrades to a probabilistic principal component analysis.

While a factor analyzer is capable of describing the spatial correlation of y, it lacks the ability to model temporal dependencies of multivariate time series data $y=\{y(1), y(2), \ldots, y(T)\}$ with a length of T because of the assumption that each y(t) is sampled independently. While the entire sequence of time series data may be treated as a single random variable, the number of free parameters in A is equal to its dimension $DT \times dT=DdT^2$, and such a large number of free parameters introduces complexity that can cause overfitting for longer time series.

To address at least some of the aforementioned drawbacks of a factor analyzer, example embodiments of the disclosure utilize a convolutional factor analyzer in which the matrix multiplication in Equation (1) (i.e., Ax) is replaced with convolution as shown in the following equation: $y=A*x+b+\epsilon$ (Equation (2)). Replacement of matrix multiplication with convolution allows for the modeling of temporal dependencies in additional to spatial dependencies.

In the above-described convolutional factor analyzer, x is a latent variable while A, b, and w are output parameters. In particular, the latent variable x can be represented as a time series $x=\{x(1), x(2), \ldots, x(T)\}$ having the same length T as y. In addition, the factor loading matrix A becomes a filter (e.g., a matrix time series) $A=\{A_1, A_2, \ldots, A_N\}$, where N is the length of the filter. The other output parameters from Equation (1)—b and $\epsilon$—are unchanged in Equation (2). The convolutional factor analyzer in accordance with example embodiments of the disclosure can thus be represented for each y(t) as $y(t)=\Sigma_{\tau=-N+1}^{t} A_{t-\tau+1} x(\tau)+b+\epsilon(t)$ (Equation (3)).

In certain example embodiments, the length of y may be T+N-1. In other example embodiments, the length of y may be truncated by restricting the values that t can take as follows: $1 \le t \le T$. As with the original factor analyzer, x may have an independent and identically distributed (i.i.d.) Gaussian distribution given by $P(x)=\Pi_{t=1}^{TN}(x_t|0, I_d)$, thereby ensuring the posterior distributions of x are also Gaussian.

As a result of replacing matrix multiplication in a factor analyzer with convolution in a convolutional factor analyzer, the number of free parameters in A is reduced from $DdT^2$ to DdN if the entire time series is modeled as a single variable with a single factor analyzer. However, as described earlier, the latent variable x is modeled as a time series with length T, and thus, there are effectively T latent variables x(t) to deal with, where $t \to 1:T$. In addition, there is likely some dependency between the T latent variables. Accordingly, example embodiments of the disclosure utilize a down-sampling approach to reduce complexity, and at the same time, decrease correlation between latent variables. If, for example, the down-sampling rate is M (e.g., M=2), then T/M latent variables may be used instead of T latent variables. Additional down-sampling may be performed to add deeper layers of latent variables, thereby generating a DCFA in accordance with example embodiments of the disclosure.

Figure 2:
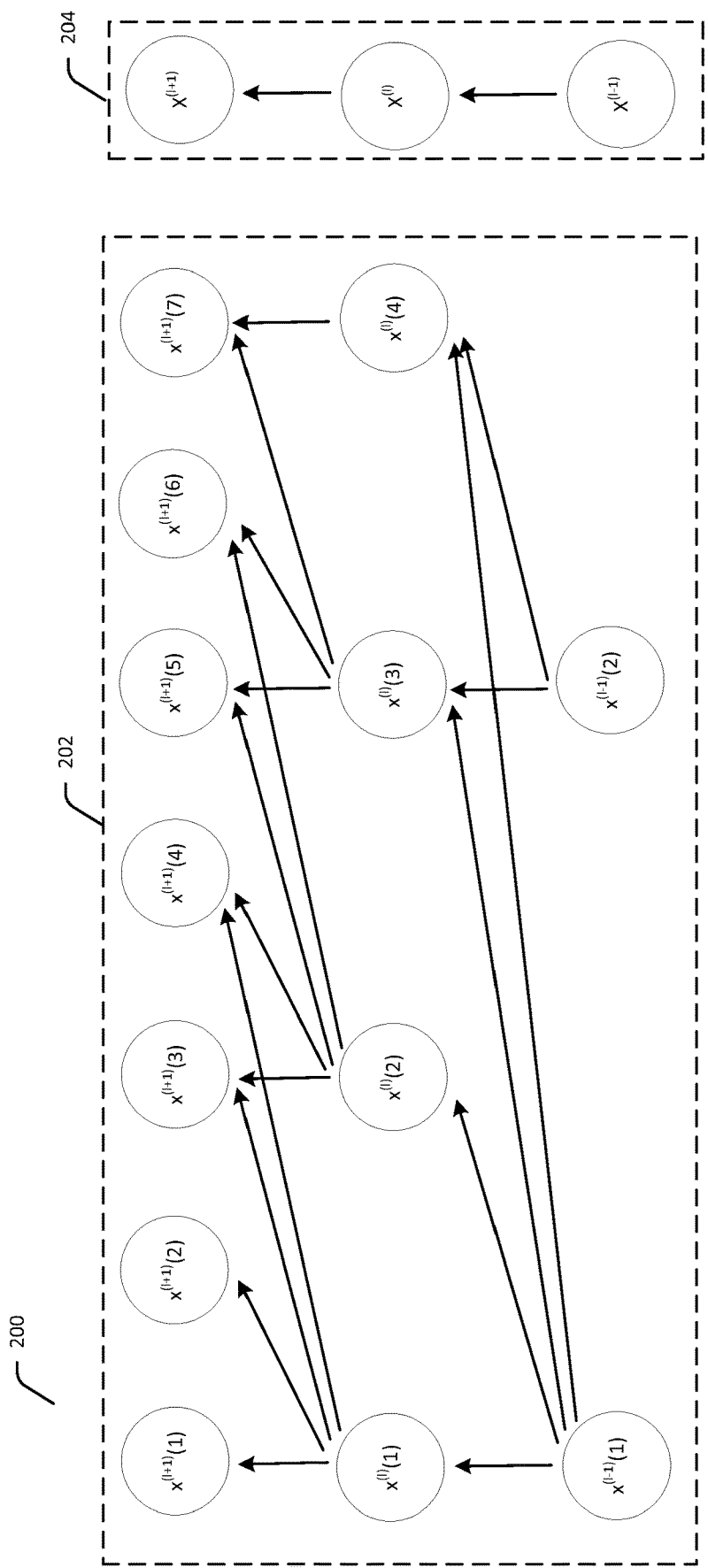
FIG. 2 is a graphical representation of a DCFA in accordance with one or more example embodiments of the disclosure.

An example graphical representation of a DCFA 200 in accordance with one or more example embodiments of the disclosure is shown in FIG. 2. The DFCA 200 is shown in a node-wise view 202 where each node denotes a variable at a certain time in a certain layer. While only three layers of the DCFA 200 are shown in the nose-wise view, it is assumed that the DCFA 200 has L layers. The topmost layer (the L-th layer) represents the original time series y. The latent time series in the l-th layer is denoted by $x^{(l)}$ with a length of $T^{(l)}$ and a spatial dimension of $d^{(l)}$. Using this convention, y can also be denoted as $x^{(L)}$. In the example DCFA 200 depicted in FIG. 2, the filter lengths are set as $N^{(l+1)}=N^{(l)}=4$ and the up-sampling rate is $M^{(l+1)}=M^{(l)}=2$.

The arrows depict dependencies between nodes. While there are no direct node dependencies within any given layer of the example DCFA 200, nodes within a given layer (except the bottom layer where nodes are i.i.d.) may be correlated with one another as a result of mutual dependencies on the same lower layer nodes. For example, nodes $x^{(l+1)}(1)$, $x^{(l+1)}(2)$, $x^{(l+1)}(3)$ and $x^{(l+1)}(4)$ in the (l+1)-th layer are correlated based on their mutual dependency on node $x^{(l)}(1)$ in the l-th layer. At the bottom layer, nodes may be independent due to their diagonal covariance matrix $R^{(l)}=I_{d^{(l)}T^{(l)}}$. At the second layer, the covariance matrix becomes denser and variables begin to exhibit local dependency. With each higher layer, variables become more correlated, as shown in the node-wise view 202 of the DCFA 200 depicted in FIG. 2. A DCFA in accordance with example embodiments of the disclosure can thus produce different representations of the data at different depths. In certain example embodiments, the filter length may dictate, at least in part, how such dependencies progress layer by layer.

Up-sampling rather than down-sampling is used when generating, for example, the DCFA 200, and thus, Equation (3) may not hold. Rather, a new latent time series $z^{(l)}$ may be introduced that is an up-sampled version of lower layer $x^{(l-1)}$. In particular, $z^{(l)}(t)$ may be defined as follows: $z^{(l)}(t)=\{x^{(l-1)}(t)(\lceil t/M(l)\rceil)$ if t mod $M^{(l)}=1$, 0 otherwise} (Equation (4)), where $M^{(l)}$ is the up-sampling rate of the l-th layer and F 1 and mod are ceiling and modulo operators, respectively.

The process for generating the DCFA 200 may include first sampling the bottom layer nodes independently as follows: $P(x^{(l)})=\Pi_{t=1}^{T} N(x^{(l)}(t)|0, I_{d^{(l)}})$ (Equation (5)). The bottom layer time series may then be up-sampled using Equation (4) to obtain a next layer time series. The next layer nodes may then be sampled independently given the previous lower layer (e.g., the bottom layer), where t may be truncated as $1 \le t \le T^{(l)}$. Sampling of the next layer nodes may be given by the following equation: $P(x^{(l)}|x^{(l-1)})=\Pi_{t=1}^{T^{(l)}} P(x^{(l)}(t)|x^{(l-1)})=\Pi_{t=1}^{T^{(l)}} N(x^{(l)}(t)|\Sigma_{\tau=t-N(l)+1}^{t} A^{(l)}_{t-\tau+1} z^{(l)}(\tau)+b^{(l)}, \psi^{(l)})$ (Equation (6)).

The above-described process is performed iteratively to generate each new successive layer of the DCFA 200 until a topmost layer representing the time series $x^{(L)}$ is generated. All layers of the DCFA 200 $x^{(l)}$ for $1 \le l \le L$ have a Gaussian distribution, and as a result, the posterior distributions of latent variables $x^{(l)}$ ($1 \le l \le L-1$) are also Gaussian. As previously described, this characteristic significantly reduces the complexity of training the DCFA 200.

FIG. 2 also depicts a layer-wise view 204 of the DCFA 200. Each layer in the layer-wise view 204 is represented by a single variable V') and the local dependency details shown in the node-wise view 202 are ignored. The layer-wise view 204 can be useful for training the DCFA 200. In particular, the time series $x^{(l)}$ can be vectorized into a column vector $X^{(l)}$. Since $X^{(l)}$ is merely a rearrangement of $x^{(l)}$, $P(X^{(l)}|X^{(l-1)})$ is essentially given by Equation (6). Then, using this layer-wise view 204, the probability of time series $X^{(L)}$ can be computed by integrating over all latent variables in a recursive fashion.

While a DCFA in accordance with example embodiments of the disclosure may have neighboring layers that interact through a bipartite graph as is also the case with a convolutional deep belief network (CDBN), the DCFA has significant technical effects and advantages over a CDBN. First, the DCFA is a directed graphical model that does not require a partition function and that permits direct computation of the probability of a time series, which provides performance improvements in connection with anomaly detection, for example. In contrast, a CBDN is a uni-directed graphical model with an intractable partition function, thereby making calculation of P(y) also intractable. In addition, a DCFA in accordance with example embodiments of the disclosure only includes linear Gaussian nodes, which as described earlier, ensures that the posterior distributions of the latent variables are also Gaussian, which, in turn, reduces the complexity of training the DCFA as compared to a CDBN in which latent nodes are nonlinear binary nodes.

Figure 4:
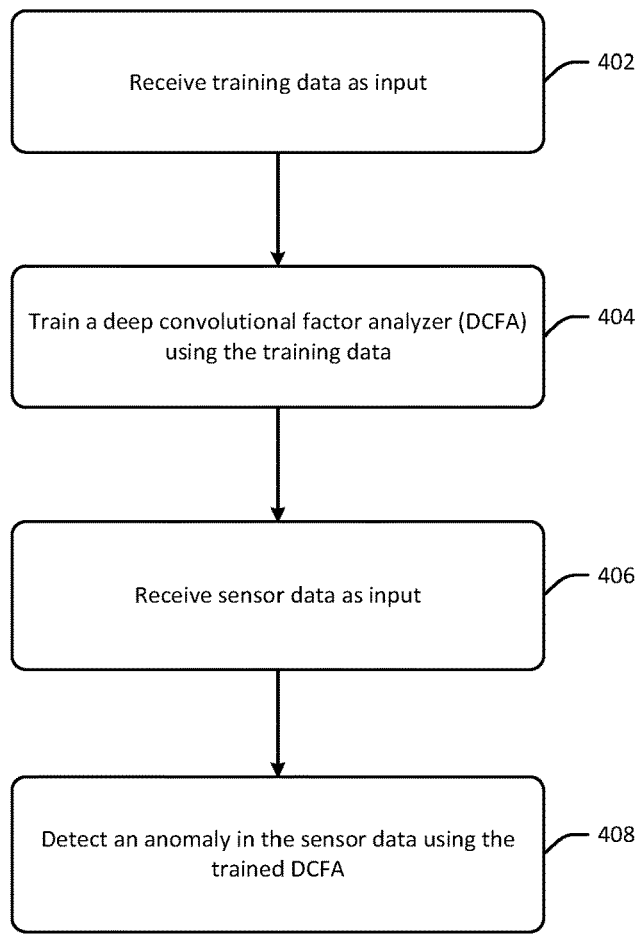
FIG. 4 is a process flow diagram of an illustrative method for training a DCFA and applying the trained DCFA to sensor data for anomaly detection in accordance with one or more example embodiments of the disclosure.
Figure 5:
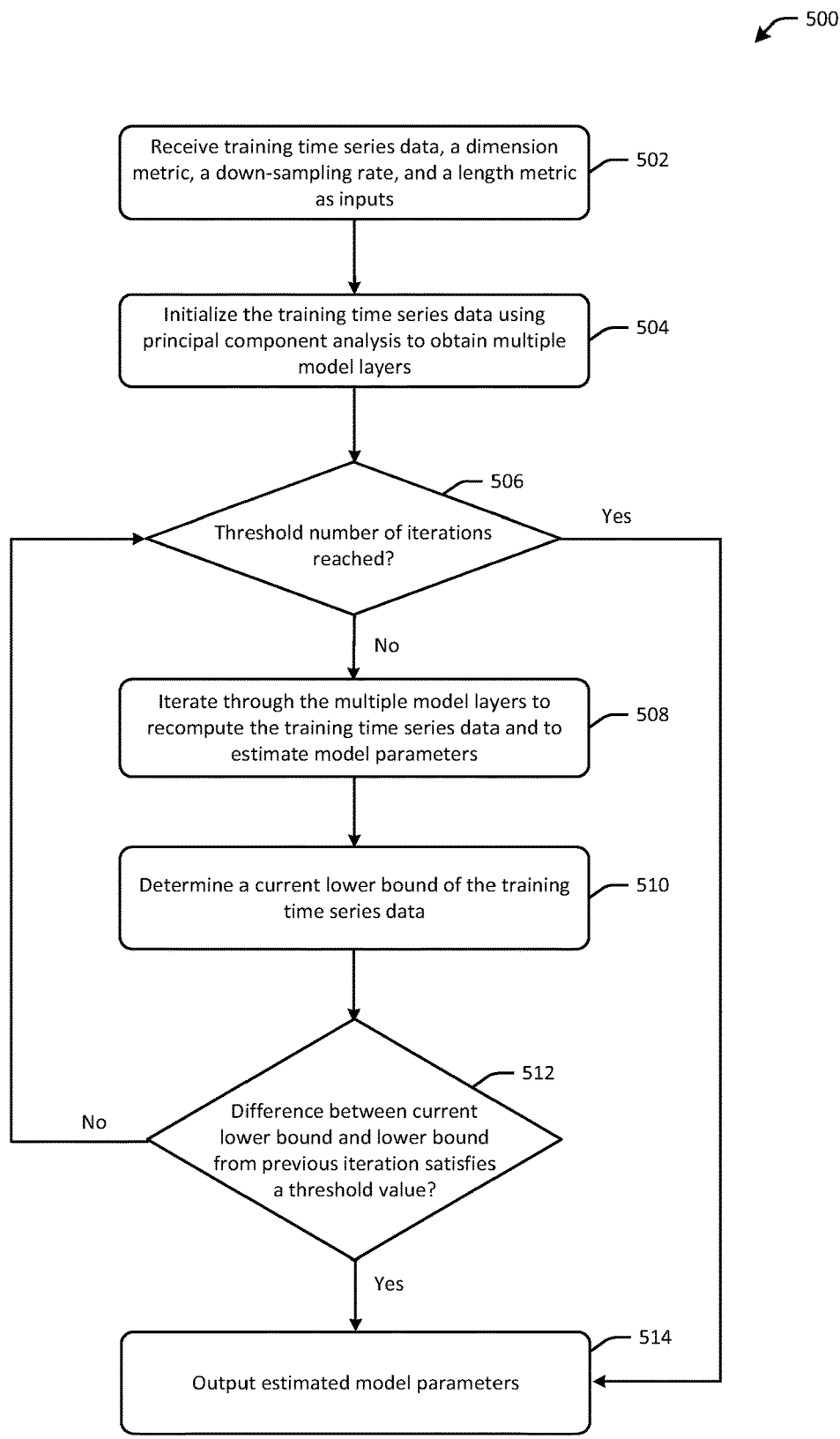
FIG. 5 is a process flow diagram of an illustrative method for training a DCFA in accordance with one or more example embodiments of the disclosure.

Training of a DCFA and application of a trained DCFA to sensor data for the purposes of anomaly detection, for example, will be described hereinafter. FIG. 1 is a hybrid system component/data flow diagram illustrating the training of a DCFA and the application of the trained DCFA to sensor data to detect an anomaly. FIG. 4 is a process flow diagram of an illustrative method 400 for training a DCFA and applying the trained DCFA to sensor data to detect an anomaly. FIG. 5 is a process flow diagram of an illustrative method 500 for training a DCFA in accordance with one or more example embodiments of the disclosure. FIGS. 1, 4, and 5 will be described in conjunction with one another hereinafter.

Each operation of either of the methods 400 or 500 may be performed by one or more components that may be implemented in any combination of hardware, software, and/or firmware. In certain example embodiments, one or more of these component(s) may be implemented, at least in part, as software and/or firmware that contains or is a collection of one or more program modules that include computer-executable instructions that when executed by a processing circuit cause one or more operations to be performed. A system or device described herein as being configured to implement example embodiments of the invention may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Referring first to FIG. 4 in conjunction with FIG. 1, at block 402, computer-executable instructions of one or more model training modules 104 may be executed to receive training data 102 as input. The training data 102 may be a ground-truth dataset that has been classified as normal data. For example, the training data 102 may be multivariate time series data captured by one or more sensors at periodic sampling intervals. At block 404, computer-executable instructions of the model training module(s) 104 may be executed to train a DCFA (or other deep convolutional generative model in accordance with example embodiments of the disclosure) using the training data 102 to obtain a trained DCFA 106.

FIG. 5 depicts a more detailed method 500 for training a DCFA in accordance with example embodiments of the disclosure. In certain example embodiments, the method 500 may represent a variational EM algorithm such as, for example, a variational Bayes algorithm. Referring now to FIG. 5, at block 502, computer-executable instructions of the model training module(s) 104 may be executed to receive training time series data, a dimension metric, a down-sampling rate, and a length metric as inputs.

It should be appreciated that the training time series data may include multiple sets of times series data. For example, using the notation described earlier, the training time series data may be represented as $x^{(L)}_{1:K}$. The time series data may be multivariate. The dimension metric may indicate a dimension $d^{(l)}$ for each layer l of the DCFA from layer 1 to layer L–1. The dimension metric, or more specifically, the series of dimension metrics may be denoted as $d^{(1:L-1)}$. The down-sampling rate may indicate a rate of down-sampling between adjacent layers. More specifically, a series of down-sampling rates may be provided that indicate a respective down-sampling rate for each layer transition starting with the down-sampling from layer L (the topmost layer) to layer L–1 and ending with the down-sampling from layer 2 to layer 1 (the bottommost layer). The series of down-sampling rates may be denoted as $M_{(2:L)}$. Finally, the length metric N may be indicative of the length of the filter A. As with the other metrics previously described, a series of length metrics may be specified, where each length metric is indicative of the length of the filter A at a particular layer (i.e., $A^{(l)}$). The series of length metrics may be denoted as $N^{(2:L)}$.

At block 504, computer-executable instructions of the model training module(s) 104 may be executed to initialize the training time series data using principal component analysis to obtain the multiple, successively down-sampled layers of the DCFA 106. Then, at block 506, computer-executable instructions of the model training module(s) 104 may be executed to determine whether a threshold number of iterations through each layer of the DCFA 106 has been reached. In response to a negative determination at block 506, the method 500 may proceed to block 508 where computer-executable instructions of the model training module(s) 104 may be executed to iterate through the multiple model layers of the DCFA 106 to recompute the training time series data and to estimate model parameters: $A_{(2:L)}$, $b^{(2:L)}$, and $\psi^{(2:L)}$. On the other hand, in response to a positive determination at block 506 indicating that a threshold number of iterations has been reached, the method 500 may proceed to block 514 where computer-executable instructions of the model training module(s) 104 may be executed to output the estimated model parameters resulting from the most recent iteration.

As previously noted, the training algorithm of method 500 may be, in certain example embodiments, a variational EM algorithm. A variational EM algorithm assumes that the posterior distribution of $x_k^{(1:L-1)}$ can be factorized, where each of the factors has a Gaussian distribution given by $Q(x_k^{(l)}(t)) = N(x_k^{(l)}(t) | m_k^{(l)}(t), v_k^{(l)}(t))$, and where $m_k^{(l)}(t)$ and $v_k^{(l)}(t)$ represent the mean and covariance, respectively. In such example cases, during each iteration (represented by block 506), each layer of the DCFA 106 may be processed with an E-step and an M-step in a top-down fashion. In the E-step (which occurs for layers below the top layer $X^{(L)}$), estimates of $m^{(l)}_{1:K}$ and may be refined. During the M-step (which occurs for layers above the bottommost layer $X^{(l)}$), estimations of the output parameters are updated.

Once an iteration is completed at bock 508, the method 500 may proceed to block 510, where computer-executable instructions of the model training module(s) 104 may be executed to determine a current lower bound of the training time series data. Then, at block 512, computer-executable instructions of the model training module(s) 104 may be executed to determine whether a difference between the current lower bound and the lower bound from a most recent previous iteration satisfies a threshold value. As used herein, and depending on the implementation, a first value may satisfy a second value if the first value is less than or equal to the second value or if the first value is greater than or equal to the second value. For example, the model training module(s) 104 may determine at block 512 whether the current lower bound is within a threshold value of the lower bound from a prior iteration.

In response to a positive determination at block 512, the method 500 may proceed to block 514 where computer-executable instructions of the model training module(s) 104 may be executed to output the estimated model parameters (e.g., $A^{(2:L)}$, $b^{(2:L)}$, and $\psi^{(2:L)}$) from the latest iteration. On the other hand, in response to a negative determination at block 512, the method 500 may again proceed to block 506 to determine whether the threshold number of iterations has been reached. The method 500 may proceed iteratively in this fashion until either the threshold number of iterations is reached or the difference in lower bounds between successive iterations satisfies a threshold value.

Figure 3:
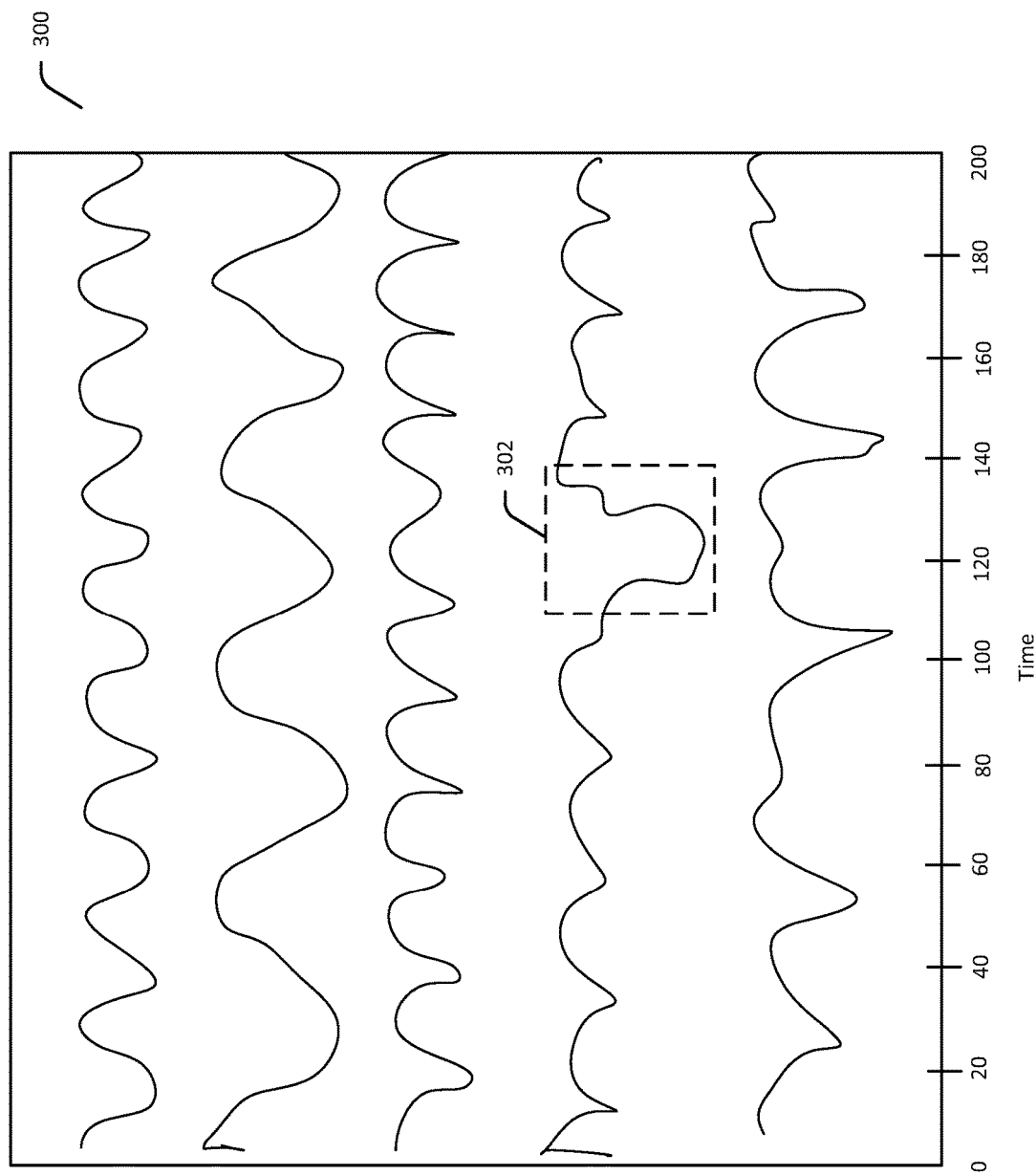
FIG. 3 is a schematic depiction of sensor data from multiple sensors that includes anomalous data in accordance with one or more example embodiments of the disclosure.

Referring again to FIG. 4, at block 406, computer-executable instructions of one or more anomaly detection modules 108 may be executed to receive new time series data (e.g., sensor data 110) as input. As shown in FIG. 3, the sensor data 110 may include, in an example embodiment, data 300 captured by multiple sensors (e.g., 6) at periodic time intervals. In the example of FIG. 3, the data 300 is a time series of 200 sampled points for each of 6 sensors, resulting in a total of 1200 data points. The 200 sampled points for each sensor may be treated as a separate time series or the 1200 sampled points may be treated as a single time series.

At block 408, computer-executable instructions of the anomaly detection module(s) 108 may be executed to detect an anomaly 112 in the sensor data 110. In particular, the trained DCFA 106 may be used to calculate a probability associated with the sensor data 110. The anomaly detection module(s) 108 may then compare the calculated probability to a threshold value to determine if the time series sensor data 110 should be classified as normal or anomalous. For example, if the calculated probability falls below a threshold value, the time series data may be classified as anomalous.

Classifying the entire time series sensor data 110 as normal or anomalous as described above may be referred to as a one-class classification. The trained DCFA 106 may also be used for anomaly localization to determine the temporal location and spatial dimension of an anomaly. To localize an anomaly, computer-executable instructions of the anomaly detection module(s) 108 may be executed to determine the probability $P((X^{(L)})_d{}^{(L)}{}_{(t-1)+i})$ of its $d^{(L)}(t-1)+i$-th position (corresponding to the t-th temporal location and the i-th spatial dimension). This probability may then be compared to a threshold value to determine whether to classify the corresponding time series value (at time t and i-th dimension) as normal or anomalous. Example anomalous data 302 is shown in FIG. 3.

In addition to anomaly detection, a DCFA in accordance with example embodiments of the disclosure may also be applied to classify a time series into one of a set of known classes. A DCFA model may be trained for each class using its own training time series data. For a test time series, the probability can be computed with respect to each DCFA model. The test time series data may then be classified in the class associated with the DCFA model for which the highest probability was calculated. A DCFA in accordance with example embodiments of the disclosure may also be applied to group a set of time series into C clusters. First, each cluster may be initialized with a seed time series. In particular, a DCFA may be learned using all of the time series data, and the time series that has the worst fit with respect to the model may be selected as the seed time series for the first cluster. A new DCFA model may then be learned for the first cluster based on this seed. The remaining time series that exhibits the worst fit for all existing cluster models may then be selected as the seed for the next cluster. This process may be repeated until an initial DCFA model has been learned for every cluster. Second, an EM algorithm may be used. In the E-step, a cluster label may be assigned to each time series with a weight. In the M-step, each cluster model may be updated using all of the time series data, each time series having the weight from the E-step assigned thereto. After the algorithm converges, each time series may be assigned to the respective cluster that gives the largest weight.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Figure 6:
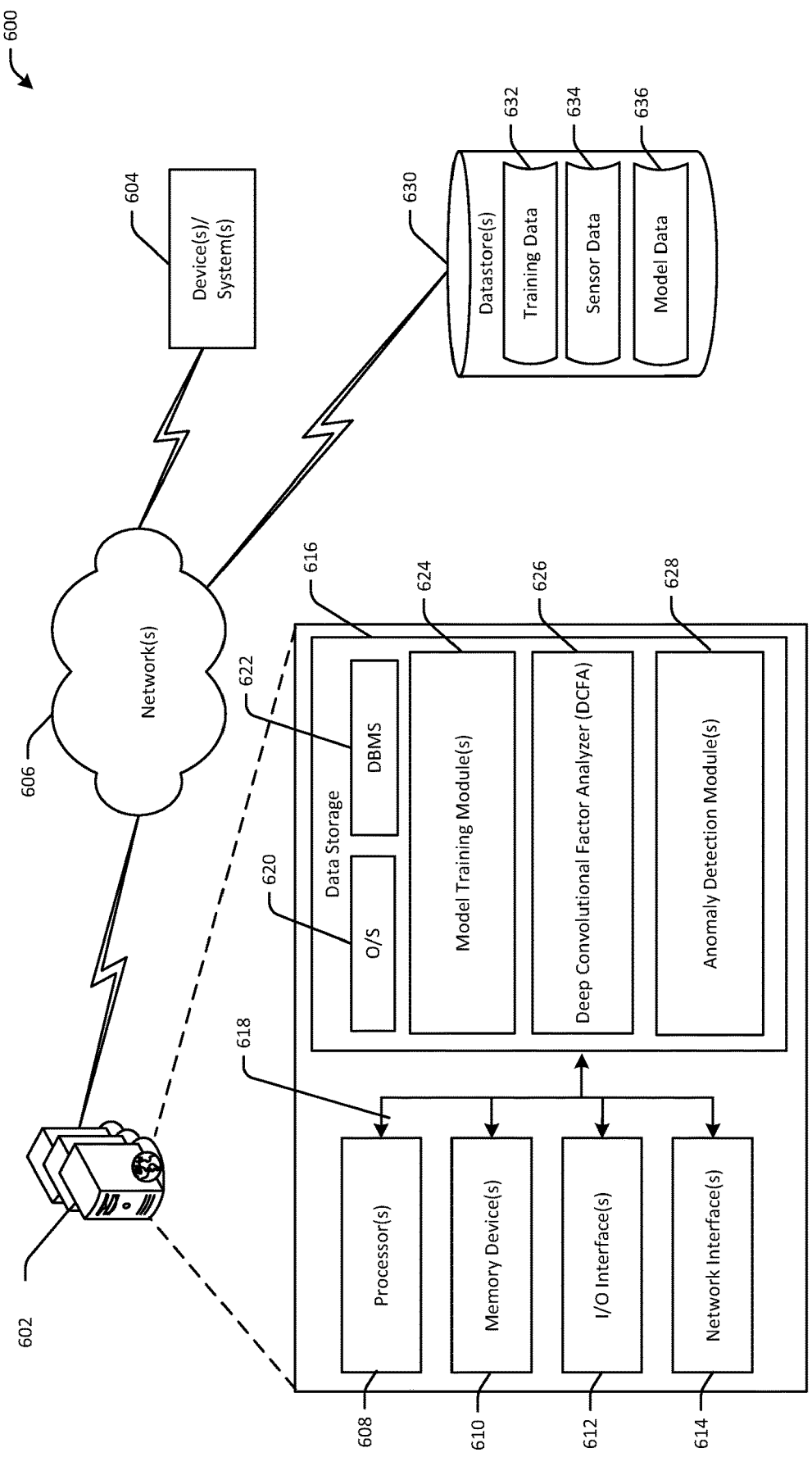
FIG. 6 is a schematic diagram of an illustrative networked architecture in accordance with one or more example embodiments of the disclosure.

FIG. 6 is a schematic diagram of an illustrative networked architecture 600 in accordance with one or more example embodiments of the disclosure. The networked architecture 600 may include one or more servers 602 and one or more other devices/systems 604. While multiple devices/systems 604 and/or multiple servers 602 may form part of the networked architecture 600, these components will be described in the singular hereinafter for ease of explanation. However, it should be appreciated that any functionality described in connection with the server 502 may be distributed among multiple servers 502 and/or among one or more other devices/systems 604. A device or system 604 may include, for example, any of a variety of sensors configured to capture data relating to operational parameters of a machine or process.

The server 602 may be configured to communicate with a device/system 604 (e.g., receive sensor data from a sensor) via one or more networks 606 which may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 606 may have any suitable communication range associated therewith and may include, for example, global networks (e.g., the Internet), metropolitan area networks (MANs), wide area networks (WANs), local area networks (LANs), or personal area networks (PANs). In addition, the network(s) 606 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server 602 may include one or more processors (processor(s)) 608, one or more memory devices 610 (generically referred to herein as memory 610), one or more input/output ("I/O") interface(s) 612, one or more network interfaces 614, and data storage 616. The server 602 may further include one or more buses 518 that functionally couple various components of the server 602. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the server 602. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 610 of the server 602 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 610 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 610 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 616 may include removable storage and/or non-removable storage including, but not limited to, magnetic storage, optical disk storage, and/or tape storage. The data storage 616 may provide non-volatile storage of computer-executable instructions and other data. The memory 610 and the data storage 616, removable and/or non-removable, are examples of computer-readable storage media (CRSM) as that term is used herein.

The data storage 616 may store computer-executable code, instructions, or the like that may be loadable into the memory 610 and executable by the processor(s) 608 to cause the processor(s) 608 to perform or initiate various operations. The data storage 616 may additionally store data that may be copied to memory 610 for use by the processor(s) 608 during the execution of the computer-executable instructions. Moreover, output data generated as a result of execution of the computer-executable instructions by the processor(s) 608 may be stored initially in memory 610, and may ultimately be copied to data storage 616 for non-volatile storage.

More specifically, the data storage 616 may store one or more operating systems (O/S) 620; one or more database management systems (DBMS) 622; and one or more program modules, applications, engines, computer-executable code, scripts, or the like such as, for example, one or more model training modules 624, a DCFA 626, and one or more anomaly detection modules 628. One or more of these program modules may include one or more sub-modules. Any of the components depicted as being stored in data storage 616 may include any combination of software, firmware, and/or hardware. The software and/or firmware may include computer-executable code, instructions, or the like that may be loaded into the memory 610 for execution by one or more of the processor(s) 608 to perform any of the operations described earlier in connection with correspondingly named modules.

The data storage 616 may further store various types of data utilized by components of the server 602 such as, for example, any of the data depicted as being stored in the data store(s) 630. Any data stored in the data storage 616 may be loaded into the memory 610 for use by the processor(s) 608 in executing computer-executable code. In addition, any data stored in the data store(s) 630 may be accessed via the DBMS 622 and loaded in the memory 610 for use by the processor(s) 608 in executing computer-executable code.

The processor(s) 608 may be configured to access the memory 610 and execute computer-executable instructions loaded therein. For example, the processor(s) 608 may be configured to execute computer-executable instructions of the various program modules, applications, engines, or the like of the server 602 to cause or facilitate various operations to be performed in accordance with one or more embodiments of the disclosure. The processor(s) 608 may include any suitable processing unit capable of accepting data as input, processing the input data in accordance with stored computer-executable instructions, and generating output data. The processor(s) 608 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 608 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 608 may be capable of supporting any of a variety of instruction sets.

Referring now to other illustrative components depicted as being stored in the data storage 616, the O/S 620 may be loaded from the data storage 616 into the memory 610 and may provide an interface between other application software executing on the server 602 and hardware resources of the server 602. More specifically, the O/S 620 may include a set of computer-executable instructions for managing hardware resources of the server 602 and for providing common services to other application programs (e.g., managing memory allocation among various application programs). In certain example embodiments, the O/S 620 may control execution of one or more of the program modules depicted as being stored in the data storage 616. The O/S 620 may include any operating system now known or which may be developed in the future including, but not limited to, any server operating system, any mainframe operating system, or any other proprietary or non-proprietary operating system.

The DBMS 622 may be loaded into the memory 610 and may support functionality for accessing, retrieving, storing, and/or manipulating data stored in the memory 610, data stored in the datastore(s) 630, and/or data stored in the data storage 616. The DBMS 622 may use any of a variety of database models (e.g., relational model, object model, etc.) and may support any of a variety of query languages. The DBMS 622 may access data represented in one or more data schemas and stored in any suitable data repository.

The data store(s) 630 may include, but are not limited to, databases (e.g., relational, object-oriented, etc.), file systems, flat files, distributed datastores in which data is stored on more than one node of a computer network, peer-to-peer network datastores, or the like. The data store(s) 630 may store various types of data such as, for example, training data 632, sensor data/test data 634, and model data 636.

Referring now to other illustrative components of the server 602, the input/output (I/O) interface(s) 612 may facilitate the receipt of input information by the server 602 from one or more I/O devices as well as the output of information from the server 602 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the server 602 or may be separate. The I/O devices may further include, for example, any number of peripheral devices such as data storage devices, printing devices, and so forth.

The I/O interface(s) 612 may also include an interface for an external peripheral device connection such as universal serial bus (USB), FireWire, Thunderbolt, Ethernet port or other connection protocol that may connect to one or more networks. The I/O interface(s) 612 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The server 602 may further include one or more network interfaces 614 via which the server 602 may communicate with any of a variety of other systems, platforms, networks, devices, and so forth. The network interface(s) 614 may enable communication, for example, with another device/system 604 and/or the data store(s) 630 via the network(s) 606.

Referring now to the other system/device 604, in an illustrative configuration, the system/device 604 may include similar hardware and/or software components as those depicted in connection with the illustrative configuration of the server 602. Further, the system/device 604 may be or include one or more sensors/sensor interfaces that may include or may be capable of interfacing with any suitable type of sensing device such as, for example, inertial sensors, force sensors, thermal sensors, optical sensors, time-of-flight sensors, and so forth. Example types of inertial sensors may include accelerometers (e.g., MEMS-based accelerometers), gyroscopes, and so forth.

It should be appreciated that the program modules, applications, computer-executable instructions, code, or the like depicted in FIG. 6 as being stored in the data storage 616 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the server 602, the device/system 604, and/or hosted on other computing device(s) accessible via one or more of the network(s) 606, may be provided to support functionality provided by the program modules, applications, or computer-executable code depicted in FIG. 6 and/or additional or alternate functionality. Further, functionality may be modularized differently such that processing described as being supported collectively by the collection of program modules depicted in FIG. 6 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 6 may be implemented, at least partially, in hardware and/or firmware across any number of devices.

It should further be appreciated that the server 602 may include alternate and/or additional hardware, software, or firmware components beyond those described or depicted without departing from the scope of the disclosure. More particularly, it should be appreciated that software, firmware, or hardware components depicted as forming part of the server 602 are merely illustrative and that some components may not be present or additional components may be provided in various embodiments. While various illustrative program modules have been depicted and described as software modules stored in data storage 616, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of any of the methods 400 and/or 500 may be performed by a server 602, by another device/system 604, or in a distributed fashion by a server 602 and such a device/system, where the server 602 may have the illustrative configuration depicted in FIG. 6, or more specifically, such operation(s) may be performed by one or more engines, program modules, applications, or the like executable on such device(s). It should be appreciated, however, that such operations may be implemented in connection with numerous other device configurations.

The operations described and depicted in the illustrative methods of FIGS. 4 and 5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 4 and 5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

That which is claimed is:

1. A method for modeling a multivariate time series to assess time series data indicative of a machine or machine component's operational state over a period of time to detect and localize potential operational anomalies, comprising:
   receiving time series data as training data;
   training a machine learning model using the training data, wherein the machine learning model comprises multiple layers and utilizes operates as a deep convolutional factor analyzer having linear Gaussian nodes, each of the Gaussian nodes representing a variable at a particular time in a particular layer, wherein variables at a bottom layer are independent and variables at higher layers gain temporal and spatial dependency through up-sampling and convoluting variables at each layer with variables of the next higher layer, wherein the training comprises:
      initializing the training time series data using principal component analysis to obtain multiple layers of the machine learning model;
      iterating through the multiple layers of the machine learning model to recompute the training time series data and to estimate output parameters;
      determining that output criteria are satisfied; and
      outputting the output parameters associated with a most recent iteration;
   receiving, by the trained machine learning model, multivariate time series sensor data as input; and
   detecting an anomaly in the sensor data using the trained machine learning model.

2. The method of claim 1, wherein detecting the anomaly comprises:
   determining, using the trained machine learning model, a probability of a time series value at a t-th temporal location and an i-th spatial dimension of a time series of the sensor data; and
   performing a comparison of the probability to a threshold value,
   classifying the time series value as normal or anomalous data based on the comparison.

3. The method of claim 1, wherein the anomaly is indicative of a sensed operational parameter of a machine having a value outside of a normal operating range.

4. The method of claim 1, wherein determining that the output criteria are satisfied comprises:
   determining a current lower bound of the training time series data responsive, at least in part, to completion of the most recent iteration; and
   determining that a difference between the current lower bound of the training time series data and a lower bound associated with a previous iteration satisfies a threshold value.

5. A system for modeling a multivariate time series to assess time series data indicative of a machine or machine component's operational state over a period of time to detect and localize potential operational anomalies, the system comprising:
   at least one memory storing computer-executable instructions; and
   at least one processor configured to access the at least one memory and execute the computer-executable instructions to:
      receive time series data as training data;
      train a machine learning model using the training data, wherein the machine learning model comprises multiple layers and operates as a deep convolutional factor analyzer having linear Gaussian nodes, each of the Gaussian nodes representing a variable at a particular time in a particular layer, wherein variables at a bottom layer are independent and variables at higher layers gain temporal and spatial dependency through up-sampling and convoluting variables at each layer with variables of the next higher layer, wherein the at least one processor is configured to train the machine learning model by executing the computer-executable instructions to:
         initialize the training time series data using principal component analysis to obtain multiple layers of the machine learning model;

iterate through the multiple layers of the machine learning model to recompute the training time series data and to estimate output parameters;
determine that output criteria are satisfied; and
output the output parameters associated with a most recent iteration;
receive, by the trained machine learning model, multivariate time series sensor data as input; and
detect an anomaly in the sensor data using the trained machine learning model.

6. The system of claim 5, wherein the at least one processor is configured to detect the anomaly by executing the computer-executable instructions to:
determine, using the trained machine learning model, a probability of a time series value at a t-th temporal location and an i-th spatial dimension of a time series of the sensor data; and
perform a comparison of the probability to a threshold value,
classify the time series value as normal or anomalous data based on the comparison.

7. The system of claim 5, wherein the anomaly is indicative of a sensed operational parameter of a machine having a value outside of a normal operating range.

8. The system of claim 5, wherein the at least one processor is configured to determine that the output criteria are satisfied by executing the computer-executable instructions to:
determine a current lower bound of the training time series data responsive, at least in part, to completion of the most recent iteration; and
determine that a difference between the current lower bound of the training time series data and a lower bound associated with a previous iteration satisfies a threshold value.

9. A computer program product comprising a computer-readable storage medium readable by a processing circuit, the computer-readable storage medium storing instructions executable by the processing circuit to cause a method to be performed, the method for modeling a multivariate time series comprising:
receiving training data as input;
training a machine learning model using the training data, wherein the machine learning model comprises multiple layers and operates as a deep convolutional factor analyzer having linear Gaussian nodes, each of the Gaussian nodes representing a variable at a particular time in a particular layer, wherein variables at a bottom layer are independent and variables at higher layers gain temporal and spatial dependency through up-sampling and convoluting variables at each layer with variables of the next higher layer, wherein the training comprises:
initializing the training time series data using principal component analysis to obtain multiple layers of the machine learning model;
iterating through the multiple layers of the machine learning model to recompute the training time series data and to estimate output parameters;
determining that output criteria are satisfied; and
outputting the output parameters associated with a most recent iteration;
receiving, by the trained machine learning model, multivariate time series sensor data as input; and
detecting an anomaly in the sensor data using the trained machine learning model.

10. The computer program product of claim 9, wherein detecting the anomaly comprises:
determining, using the trained machine learning model, a probability of a time series value at a t-th temporal location and an i-th spatial dimension of a time series of the sensor data; and
performing a comparison of the probability to a threshold value,
classifying the time series value as normal or anomalous data based on the comparison.

11. The computer program product of claim 9, wherein the machine learning model is a deep convolutional factor analyzer.

12. The computer program product of claim 9, wherein determining that the output criteria are satisfied comprises:
determining a current lower bound of the training time series data responsive, at least in part, to completion of the most recent iteration; and
determining that a difference between the current lower bound of the training time series data and a lower bound associated with a previous iteration satisfies a threshold value.

* * * * *